3,064,033
METHOD FOR PREPARING HIGHER MOLECULAR WEIGHT ETHYNYLBORONATES
William David English, Garden Grove, Calif., assignor to United States Borax & Chemical Corporation, Los Angeles, Calif., a corporation of Nevada
No Drawing. Filed Mar. 15, 1961, Ser. No. 95,805
4 Claims. (Cl. 260—462)

The present invention relates to a method for transferring esters of boron.

The reaction of esters of boric acid with alcohols having a greater number of carbon atoms to form higher molecular weight borates is well known; this method, transesterification, however, is not applicable to esters of certain boronic acids. Ethynylboronates, for example, can not undergo transesterification with an alcohol due to the undesirable reactivity of the ethynyl radical with hydroxyl groups which causes cleavage and decomposition of the ethynylborate ester.

It is therefore the principal object of the present invention to provide an economical and efficient method for preparing higher molecular weight ethynylboronates.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of transesterifying esters of boron which comprises heating an ethynylboronate having the formula $HC \equiv CB(OR)_2$ with a borate having the formula $B(OR')_3$, said reactants having higher boiling points than at least one of the reaction products, removing the reaction product having the lower boiling point by distillation and then recovering the reaction product having the higher boiling point from the residual mass, where R is selected from the group consisting of alkyl and cycloalkyl radicals of from 1 to 8 carbon atoms and phenyl, and R' is selected from the group consisting of alkyl and cycloalkyl radicals of from 1 to 20 carbon atoms, alkenyl and alkynyl radicals of no more than 18 carbon atoms, haloalkyl and halocycloalkyl radicals of from 1 to 12 carbon atoms, phenyl, halogen substituted phenyl, and alkyl and cycloalkyl substituted phenyl.

The reaction described in the foregoing broadly stated paragraph can best be illustrated by the following equation:

$$3HC \equiv CB(OR)_2 + 3B(OR')_3 \rightarrow 3HC \equiv CB(OR')_2 + 2B(OR)_3$$

where R and R' are as defined above.

From the foregoing broadly stated paragraph and illustrative equation it will be seen that the present invention provides a method for interchanging the ester portion of an ethynylboronate while simultaneously preserving the ethynylboronate molecular structure.

Referring now to the reactants applicable to the present invention, the following list is illustrative of the borates which can be used:

Triisopropyl borate
Tri-n-amyl borate
Triisooctyl borate
Tri-t-butyl borate
Tri-n-octadecyl borate
Tricyclohexyl borate
Tri-1-chloroethyl borate
Tri-(2,2-dibromobutyl) borate
Tri-(2,3-difluorododecyl) borate
Tri-(2-cyclohexylcyclohexyl) borate
Triallylborate
Trialeyl borate
Triphenylborate
Tri-(2-chlorophenyl) borate
Tri(2,4-diiodophenyl) borate
Tri-(3,4,5-triisopropyl) borate
Tri-(2,4-dimethylphenyl) borate
Tri-(4-cyclohexylphenyl) borate
Tri-(2-phenylcyclohexyl) borate The following list is illustrative of the ethynylboronates applicable to the present invention:

Dimethyl ethynylboronate
Di-n-propyl ethynylboronate
Dicyclohexyl ethynylboronate
Di-n-octyl ethynylboronate
Diphenyl ethynylboronate
Diethyl ethynylboronate It is to be clearly understood that the foregoing lists are only a partial enumeration of the borates and ethynylboronates applicable to the present invention and are not intended to limit the invention.

A requirement for performing the present ester interchange is that the reactants must have higher boiling points than at least one of the reaction products. It is the difference in boiling points which provides the driving force for the reaction. As the reaction proceeds, the product having the lower boiling point may be removed by distillation. This can be continued until all of the lower boiling compound is formed and finally removed, and then the second reaction product and any remaining reactant are separated and recovered.

While the reaction will proceed using any ratio of reactants, the stoichiometry of the reactants controls the reaction rate and the yield of desired product. When the ethynylboronate is present in excess of the stoichiometric amount a long heating period is required and only fair yields of product are obtained. When the borate is present in excess of the stoichiometric amount the heating time is lowered appreciably and the yield of product approaches 100% of the theoretical amount possible. Therefore, in the preferred embodiment of the invention I use from about the stoichiometric amount to about three times the stoichiometric amount of borate required for the complete reaction.

So that the present invention can be more clearly understood, the following examples are given for illustrative purposes:

I

To a 500 ml. round-bottomed flask equipped with an 18-inch packed distillation column and variable distillation head was added 73.5 grams (0.75 mole) of dimethyl ethynylboronate and 290 grams (1.0 mole) of triphenyl borate, twice the stoichiometric amount required. The mixture was heated for about 6 hours and then the temperature was lowered. The first fraction recovered from the distillation was trimethyl borate, 51 grams (98.1% yield). The remainder of the reaction mass was distilled and 154.9 grams (93.1% yield) of diphenyl ethynylboronate was recovered. Chemical analysis of the products yielded the following data:

Calculated for $B(OCH_3)_3$: $B = 10.41\%$. Found in product: $B = 10.44\%$.

Calculated for $HC \equiv CB(OC_6H_5)_2$: $B = 4.87\%$. Found in product: $B = 4.82\%$.

II

To a 500 ml. round-bottomed flask equipped with an 18-inch packed distillation column and variable distillation head was added 73.5 grams (0.75 mole) of dimethyl ethynylboronate and 273 grams (1.5 mole) of triallyl borate, three times the stoichiometric amount required. The mixture was heated under reflux for about 4.5 hours and then fractionally distilled. The first fraction recovered from the distillation was trimethyl borate, 51.1 grams (98.4% yield). The remainder of the reaction mass was distilled and 106 grams (94.2% yield) of diallyl ethynylboronate was recovered. Chemical analysis of the products yielded the following data:

Calculated for $B(OCH_3)_3$: $B=10.41\%$. Found in product: $B=10.47\%$.

Calculated for $HC \equiv CB(OCH_2-CH=CH_2)_2$: $B=7.22\%$. Found in product: $B=7.20\%$.

III

To a 500 ml. round-bottomed flask equipped with an 18-inch packed distillation column and variable distillation head was added 94.5 grams (0.75 mole) of diethyl ethynylboronate and 308 grams (1.0 mole) of tricyclohexyl borate, twice the stoichiometric amount required. The mixture was heated under reflux for about 5.5 hours and then fractionally distilled. The first fraction recovered from the distillation was triethyl borate, 71.3 grams (97.7% yield). The remainder of the reaction mass was distilled and 161.1 grams (91.8% yield) of dicyclohexyl ethynylboronate was recovered. Chemical analysis of the products yielded the following data:

Calculated for $B(OC_2H_5)_3$: $B=7.42\%$. Found in product: $B=7.47\%$.

Calculated for $HC \equiv CB(OC_6H_{11})_2$: $B=4.63\%$. Found in product: $B=4.58\%$.

Ths foregoing examples disclose the reactions being carried out without the presence of solvents. However, it is to be clearly understood that any of the present reactions can be carried out in the presence of any solvent which does not have active hydrogen.

Other modes of applying the principle of the invention may be employed, change being made as regards the details described, provided the features as stated in any of the following claims or the equivalent of such be employed.

I, therefore, particularly point out and distinctly claim as my invention:

1. The method of transesterifying esters of boron which comprises heating an ethynylboronate having the formula $HC \equiv CB(OR)_2$ with a borate having the formula $B(OR')_3$, said reactants having higher boiling points than at least one of the reaction products, removing the reaction product having the lower boiling point by distillation and then recovering the reaction product having the higher boiling point from the residual mass, where R is selected from the group consisting of alkyl and cycloalkyl radicals of from 1 to 8 carbon atoms and phenyl, and R' is selected from the group consisting of alkyl and cycloalkyl radicals of from 1 to 20 carbon atoms, alkenyl radicals of from 2 to 18 carbon atoms, haloalkyl and halocycloalkyl radicals of from 1 to 12 carbon atoms, phenyl, halogen substituted phenyl, and alkyl and cycloalkyl substituted phenyl.

2. The method of producing diphenyl ethynylboronate which comprises heating dimethyl ethynylboronate with about twice the stoichiometric amount of triphenyl borate, distilling and recovering trimethyl borate, and recovering substantially pure diphenyl ethynylboronate from the residual mass.

3. The method of producing diallyl ethynylboronate which comprises heating dimethyl ethynylboronate with about three times the stoichiometric amount of triallyl borate, distilling and recovering trimethyl borate, and recovering substantially pure diallyl ethynylboronate from the residual mass.

4. The method of producing dicyclohexyl ethynylboronate which comprises heating diethyl ethynylboronate with about twice the stoichiometric amount of tricyclohexyl borate, distilling and recovering triethyl borate, and recovering substantially pure dicyclohexyl ethynylboronate from the residual mass.

No references cited.

UNITED STATES PATENT OFFICE
CERTIFICATE OF CORRECTION

Patent No. 3,064,033            November 13, 1962

William David English

It is hereby certified that error appears in the above numbered patent requiring correction and that the said Letters Patent should read as corrected below.

Column 1, line 55, after the pluse sign in the equation, for "$3B(OR')_3$" read -- $2B(OR')_3$ --; column 2, line 7, for "Trialeyl borate" read -- Trioleyl borate --; line 11, for "Tri-(3,4,5-triisopropyl)borate" read -- Tri-(3,4,5-triisopropylphenyl)borate --.

Signed and sealed this 23rd day of April 1963.

(SEAL)
Attest:

ERNEST W. SWIDER            DAVID L. LADD
Attesting Officer            Commissioner of Patents